United States Patent [19]

Wei et al.

[11] Patent Number: 5,378,264

[45] Date of Patent: Jan. 3, 1995

[54] MICROEMULSION FORMATION IN OFFGAS SCRUBBING

[75] Inventors: Maurice W. Wei, Sewickley; Girma Biresaw, Lower Burrell, both of Pa.

[73] Assignee: Aluminum Company of America, Pittsburgh, Pa.

[21] Appl. No.: 984,900

[22] Filed: Dec. 2, 1992

[51] Int. Cl.[6] ............................................. B01D 47/06
[52] U.S. Cl. ............................................. 95/154; 95/237; 423/245.2
[58] Field of Search .................... 95/150, 154, 237; 423/245.2

[56] References Cited

U.S. PATENT DOCUMENTS

| | | | |
|---|---|---|---|
| 3,324,629 | 6/1967 | Graswich et al. | 95/150 |
| 3,593,496 | 7/1971 | Merrill | 55/77 |
| 3,633,340 | 1/1972 | Illingworth | 55/84 |
| 4,028,072 | 6/1977 | Braun et al. | 55/195 |
| 4,265,642 | 5/1981 | Mir et al. | 55/85 |
| 4,353,715 | 10/1982 | Mir et al. | 55/22 |
| 4,378,235 | 3/1983 | Cosper et al. | 95/154 |
| 4,750,919 | 6/1988 | Patzelt et al. | 95/154 |
| 4,781,848 | 11/1988 | Biresaw et al. | 252/49.5 |
| 4,925,462 | 5/1990 | Glass et al. | 95/150 |
| 4,994,245 | 2/1991 | Murray et al. | 423/245.2 |
| 5,017,351 | 5/1991 | Rafson | 55/85 |

FOREIGN PATENT DOCUMENTS

| | | |
|---|---|---|
| 0073171 | 2/1983 | European Pat. Off. . |
| 112053 | 6/1984 | European Pat. Off. ............. 95/154 |

*Primary Examiner*—Michael Lewis
*Assistant Examiner*—Peter DiMauro
*Attorney, Agent, or Firm*—Glenn E. Klepac

[57] ABSTRACT

An offgas containing an organic compound is scrubbed by providing a spray of a scrubbing fluid containing a water-soluble organic surfactant, an organic cosurfactant comprising an alkanediol and water. The spray is mixed with an offgas containing a volatile organic compound, thereby forming an oil-in-water microemulsion and reducing content of the organic compound in the offgas. The process and apparatus of the invention are especially suitable for scrubbing offgas generated by aluminum rolling mills.

10 Claims, 1 Drawing Sheet

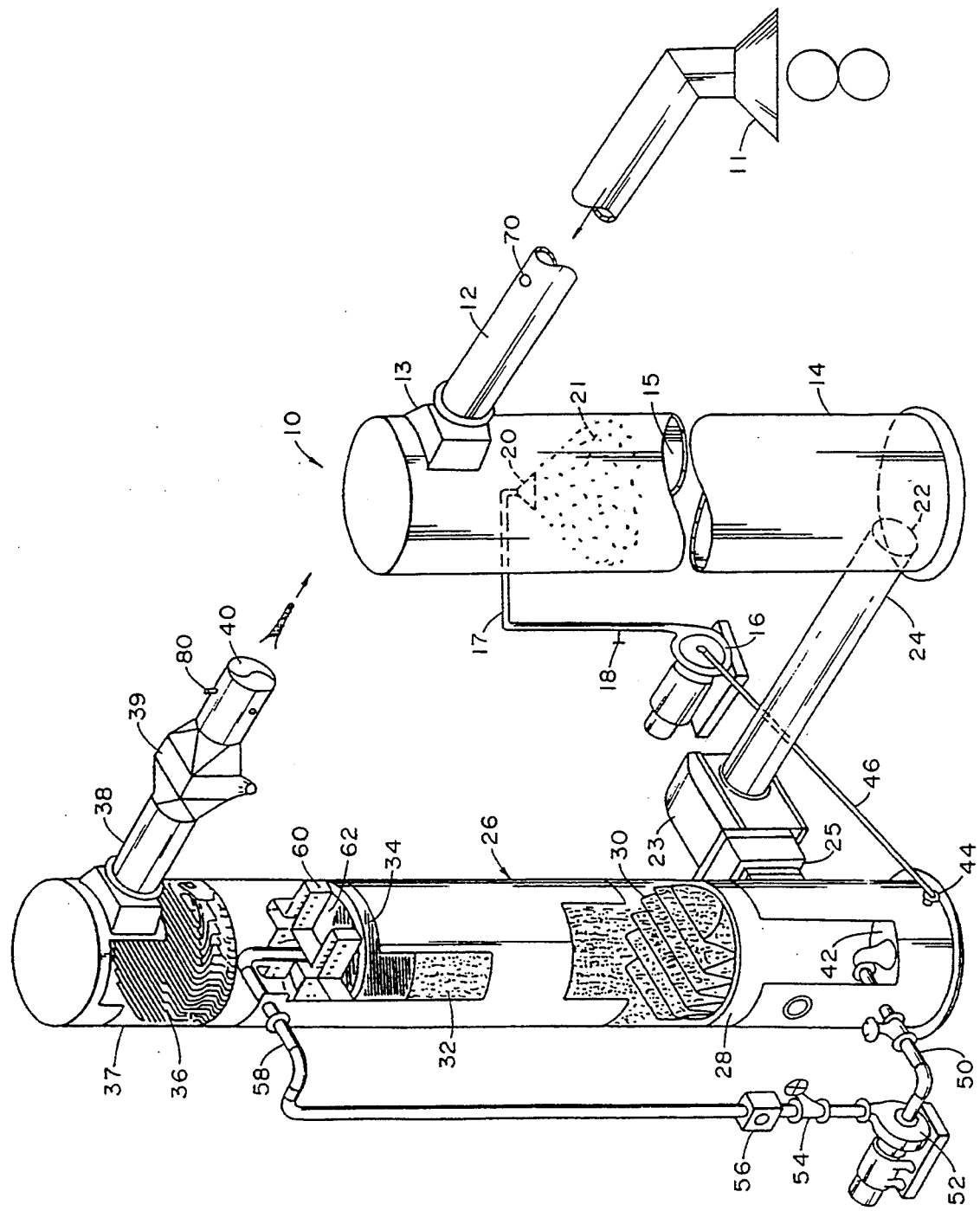

MICROEMULSION FORMATION IN OFFGAS SCRUBBING

FIELD OF THE INVENTION

The present invention relates to a process and apparatus for scrubbing offgases which contain volatile organic carbon. Such offgases are generated in various industrial processes, and they are difficult to clean because they may contain vapors of oil or various other hydrocarbons.

BACKGROUND OF THE INVENTION

Offgases containing volatile organic carbon are generated in many different industrial processes. One of such processes involves the production of aluminum alloy sheet and foil by passing an aluminum alloy body through sets of metal rolls while spraying a rolling mill coolant, typically containing a light mineral oil, onto the aluminum alloy body as it passes through the mill. Alternatively, the coolant may be an emulsion comprising about 5-10 wt. % mineral oil. Heat produced from the rolling process vaporizes some of the rolling mill coolant thereby generating an oil fume which enters the atmosphere surrounding the mill. This oil fume consists mostly of mineral oil vapor combined with some oil mist. When the coolant is an emulsion, the fume contains a substantial amount of water vapor.

Several conventional methods are available for controlling volatile organic carbons in industrial offgases. A first method involves a centrifugal separator for removing only the oil mist particles which generally constitute approximately 10-30 wt % of the oil fume from the mill. A second method involves a carbon absorption bed to remove vapor only. In the carbon absorption bed process, any oil mist particles must first be removed to avoid wetting and "poisoning" the carbon. Otherwise, the oil mist deactivates the carbon bed when it is coated by the oil mist by wetting the carbon absorbent. A third method involves absorbing the oil fume in heavy oil. The oil then is vacuum distilled several times to separate the light mineral oil from the heavy oil.

These conventional methods for controlling volatile hydrocarbons from industrial processes have serious drawbacks making them less than entirely suitable for their intended purpose. The centrifugal separate method suffers from a low overall removal efficiency and does little to remove oil vapors in the fume from the rolling mill. The carbon absorption bed method has severe difficulty in operating on fumes containing even small amounts of oil mist, and the heavy oil absorption method is expensive to install and operate.

A principal objective of the present invention is to provide a process for scrubbing an industrial offgas, which process results in the formation of an oil-in-water microemulsion. Because microemulsions are thermodynamically stable, the process is capable of being operated at relatively high efficiency and at satisfactory cost.

A related objective of the invention is to provide a process for removing oil mists and oil vapors generated from rolling mills in the production of aluminum alloys sheet or foil.

Additional objectives and advantages of tile present invention will become apparent to persons skilled in the art from the detailed description that follows.

BRIEF DESCRIPTION OF THE DRAWING

The sole Figure is a schematic illustration of an apparatus for scrubbing an offgas in accordance with the present invention.

SUMMARY OF THE INVENTION

In accordance with tile present invention, there is provided a process and apparatus for scrubbing an offgas containing a volatile organic carbon compound, preferably a hydrocarbon. The invention is particularly suitable for scrubbing oil-containing offgases generated in rolling mills for producing aluminum alloy sheet and foil.

As used herein, the term "offgas" refers to the effluent generated by vaporization of some of the coolant in aluminum rolling mills. The coolant generally comprises an emulsion for hot rolling processes; an emulsion or mineral oil for cold rolling; and mineral oil for foil rolling. The offgas generally contains a volatile organic carbon vapor in combination with a small amount of mist.

The method and apparatus of the present invention were devised for scrubbing industrial offgases to remove oils, including mineral oil, synthetic oil and oils of vegetable and animal origin. The invention is also suitable for treating offgases to remove various other forms of volatile organic carbon that are capable of forming microemulsions. Such other compounds include volatile organic solvents such as methyl ethyl ketone, benzene, toluene, chloroform, Freons (chlorofluorocarbons) and other perhalogenated hydrocarbons.

The apparatus is provided with inlet means for introducing an offgas into the chamber, outlet means for venting scrubbed offgas from the chamber and a spray nozzle for spraying a scrubbing fluid into the chamber. The scrubbing fluid comprises a water-soluble organic surfactant, an organic cosurfactant comprising a $C_4$-$C_{12}$ alkanediol and water.

The surfactant may be anionic. cationic, amphoteric or nonionic with nonionic surfactants being preferred. A particularly preferred nonionic surfactant is sold under the trade name "Lauryl Diethanolamide" and comprises a mixture of $C_8$-$C_{18}$ diethanolamides.

Some other suitable nonionic surfactants include other fatty acid diethanolamides, ethoxylated fatty oils such as ethoxylated castor oil and ethoxylated alkyl and dialkyl phenols wherein the alkyl groups have from 6 to 22 and preferably 8 to 12 carbon atoms. Such surfactants include, for example, polyethoxylated nonylphenols having about 6 to 13 ethoxyl groups. Some suitable anionic surfactants are sodium dodecylsulfate, synthetic sodium sulfonates including sodium dodecylbenzene sulfonate and sodium hyxadecyl sulfonate, dipotassium isooctadecenyl succinate and sodium dioctyl sulfosuccinate.

The scrubbing fluid also contains a $C_4$-$C_{12}$ alkanediol. Two preferred cosurfactants are 1,2-octanediol and 1,2-decanediol. Some other suitable alkane diols are 1,2-heptanediol; 2,5-dimethyl- 1,2-hexanediol: 2-methyl-1,2-octanediol; 1-methyl- 1,2-nonanediol; 2-methyl-1,2-decanediol; 2-methyl-1,2-undecanediol and homologues of such compounds. Mixtures of two or more 1,2-alkanediols are also suitable. A particularly preferred composition utilizes 1,2-octanediol.

The surfactant and cosurfactant are dissolved in water. The water should contain less than about 1 wt. % dissolved inorganic salts, preferably less than about 200 ppm dissolved salts. Distilled or deionized water having an electrical conductivity of less than about 400 $\mu$mho/cm is particularly preferred.

The scrubbing fluid preferably contains about 1-30 wt. % of an anionic or nonionic surfactant, about 1-20 wt. % alkanediol and remainder water. More preferably, the fluid contains about 1-20 wt. % of the surfactant and about 1-10 wt. % alkanediol.

The scrubbing fluid may also contain other additives. Such additives include antifoam agents, biocides, oxidation inhibitors and corrosion inhibitors.

An advantage of the present invention is that when the scrubbing fluid contacts oil in an offgas, there is formed an oil-in-water microemulsion. As used herein, the term "oil-in-water microemulsion" refers to a clear, thermodynamically stable solution of oil or other volatile organic compound in water. The organic compound is solubilized by the surfactant and cosurfactant in the scrubbing fluid. A microemulsion is sometimes called a "micellar emulsion".

Microemulsion droplets separated from the offgas are collected to form a mass of a microemulsion which is then separated into oil fraction and an aqueous fraction. The oil fraction may be combined with other ingredients to form a recycled lubricant composition.

DETAILED DESCRIPTION OF A PREFERRED EMBODIMENT

There is shown in the Figure an apparatus 10 for scrubbing offgas in accordance with the present invention. The offgas may be generated, for example, in a rolling mill having a fume exhaust duct 11 (shown schematically).

The offgas comprises an oil fume that is generated when heat produced by the rolling process vaporizes some of the rolling mill coolant. This oil fume consists mostly of mineral oil vapor together with some oil mist.

Offgas from the exhaust duct 11 is carried through a carrier duct 12 to an inlet or first inlet means 13 in a cocurrent spray tower 14 defining a chamber 15. An electric pump 16 propels scrubbing fluid through a supply line 17 having a control valve 18 to a first spray nozzle 20 which emits an aerosol spray 21. Droplets of the spray 21 combine with oil in the offgas to form an oil-in-water microemulsion. The scrubbed offgas (including microemulsion droplets) exits the tower 14 through an outlet or first outlet means 22.

A fan 23 propels the scrubbed offgas and microemulsion droplets through a connecting duct 24 and gas flow control damper or second inlet means 25 into a packed column or absorber 26. Offgas containing the scrubbing fluid aerosol mist enters a lower portion 28 of the column 26 and passes successively through a gas distribution plate 30, random packing 32, foam generation bed 34 and first mist eliminator 36. The scrubbed gas leaves an upper portion 37 of the column 26 through a second outlet duct or outlet means 38, second mist eliminator 39 and ductwork 40 to a stack (not shown).

The scrubbing fluid is collected in a sump 42 located at the bottom of the column 26. A high pressure pump 16 recirculates the collected fluid from the column 26 through a connecting line 46 and supply line 17 to the spray nozzle 20 which emits an aerosol mist or spray 21. In this operating mode, the packed column 26 operates as a contact chamber and mist eliminator because the larger entrained droplets are removed by the packing 32, and additional absorption of oil vapor occurs on wetted surfaces of the packing. This is the preferred mode of operation.

In an alternative operating mode, the packed column 26 is operated as a countercurrent scrubber by transporting the scrubbing fluid from the sump 42 successively through a pipe 50, electric pump 52, liquid rate control valve 54, liquid flow meter 56 and supply pipe 58 into the column 26. There, a liquid distributor or second nozzle 60 causes the liquid 62 to flow evenly over the random packing 32, countercurrent to offgas flowing upwardly through the column 26. Alternatively, and less preferably, an antifoam agent may be added to the scrubbing fluid to avoid foam generation in the column 26. Contact between the wetted random packing material 32 and offgas rising through the column 26 results in further capture of oil vapor and mist from the gas stream.

The random packing material 32 may be metal, ceramic or plastic and preferably comprises a plurality of randomly arranged solid packing members such as Raschig rings, Lessing rings, partition rings or Pall rings. The packing material 32 occupies a packed bed having a free space (space not occupied by packing members) equivalent to more than 60% of the total packed bed volume.

When the scrubbing fluid spray combines with oil in the offgas, there is formed an oil-in-water microemulsion. Unlike emulsions, microemulsions are thermodynamically stable and optically clear. Because microemulsions are thermodynamically stable, the process of the present invention is capable of removing a higher proportion of oil from the offgas than comparable processes relying upon formation of emulsions. The process is also capable of being operated less expensively than carbon absorption beds and heavy oil separation methods.

Some scrubbing fluids were made up with compositions as shown in the following Table 1.

TABLE I

| Scrubbing Fluid Compositions | | | |
|---|---|---|---|
| | Composition (wt. %) | | |
| Ingredient | A | B | C |
| Mixture of $C_8$-$C_{18}$ Diethanolamides (Surfactants) | 5.0 | 12.5 | 18.6 |
| 1,2-Octanediol (Cosurfactant) | 2.0 | 4.0 | 7.0 |
| Deionized Water | 93.0 | 83.5 | 74.4 |

A set of tests was conducted to determine hydrocarbon removal efficiency of the process and apparatus of the present invention. The inlet duct 12 was provided with inlet sampling ports 70, and the outlet duct 40 was provided with outlet sampling ports 80. Samples were removed at both sets of ports 70, 80 and hydrocarbon concentrations were measured with a flame ionization detector. The results summarized in the following Table 2 show that hydrocarbon removal efficiency averaged about 87% for the three tests. These results compute favorably with prior art scrubbing techniques.

TABLE 2

| Test No. 1 VOC (ppm) | | Test No. 2 VOC (ppm) | | Test No. 3 VOC (ppm) | |
|---|---|---|---|---|---|
| Inlet | Outlet | Inlet | Outlet | Inlet | Outlet |
| 147 | 21 | 134 | 20 | 117 | 10 |
| 147 | 21 | 191 | 19 | 122 | 12 |
| 161 | 19 | 210 | 29 | 133 | 15 |

TABLE 2-continued

| | Test No. 1 VOC (ppm) | | Test No. 2 VOC (ppm) | | Test No. 3 VOC (ppm) | |
|---|---|---|---|---|---|---|
| | Inlet | Outlet | Inlet | Outlet | Inlet | Outlet |
| | 174 | 20 | 218 | 23 | 141 | 17 |
| | 172 | 22 | 228 | 28 | 145 | 19 |
| | 180 | 23 | 233 | 30 | 148 | 19 |
| | 179 | 24 | 237 | 28 | 150 | 19 |
| | 182 | 25 | 241 | 31 | 160 | 21 |
| | 181 | 25 | 236 | 32 | 164 | 22 |
| | 185 | 25 | 249 | 34 | 116 | 16 |
| | 183 | 26 | 250 | 35 | 131 | 16 |
| | 145 | 21 | 253 | 36 | 142 | 16 |
| | 160 | 21 | 261 | 36 | 142 | 18 |
| | 174 | 22 | 261 | 36 | 127 | 18 |
| | 183 | 23 | 240 | 36 | 148 | 19 |
| | 184 | 26 | 282 | 37 | 149 | 21 |
| | 186 | 25 | 296 | 39 | 148 | 21 |
| | 187 | 24 | 294 | 41 | 150 | 21 |
| | 187 | 25 | 221 | 27 | 148 | 21 |
| | 188 | 27 | 220 | 37 | 119 | 15 |
| | 191 | 29 | 228 | 36 | 157 | 14 |
| | 189 | 28 | 232 | 37 | 186 | 17 |
| | 142 | 20 | 238 | 37 | 193 | 18 |
| | 187 | 19 | 233 | 39 | 201 | 24 |
| | 201 | 19 | 262 | 38 | 216 | 23 |
| | 213 | 21 | 268 | 41 | 218 | 25 |
| | 219 | 27 | 276 | 40 | 237 | 27 |
| | 224 | 28 | 286 | 42 | 246 | 29 |
| | 222 | 29 | 331 | 44 | 247 | 31 |
| | 226 | 29 | | | 252 | 33 |
| | 226 | 30 | | | 263 | 34 |
| | 221 | 31 | | | | |
| | 228 | 31 | | | | |
| | 224 | 31 | | | | |
| Average | 182 | 25 | 238 | 33 | 168 | 20 |
| Efficiency (wt. %) | 86.3 | | 86.1 | | 88.1 | |

Having thus described the invention, what is claimed is:

1. A process for scrubbing a gas containing an organic compound, said process comprising:

(a) providing a spray of a scrubbing fluid containing water, about 1-30 wt % of a water-soluble anionic or nonionic surfactant, and about 1-20 wt % of an organic cosurfactant consisting of 1,2-octanediol;

(b) mixing said spray with a gas containing a volatile organic compound, under conditions effective for spray droplets to form an oil-in-waiter microemulsion combined with a scrubbed gas; and (c) separating said scrubbed gas from the microemulsion, said scrubbed gas having a reduced content of the organic compound.

2. The process in accordance with claim 1 wherein the water in said scrubbing fluid contains less than about 1 wt. % dissolved inorganic salts.

3. The process in accordance with claim 1 wherein the water in said scrubbing fluid has an electrical conductivity of less than about 400 μmho/cm.

4. The process in accordance with claim 1 wherein said scrubbing fluid contains about 1-20 wt. % anionic or nonionic surfactant and about 1-10 wt. % 1,2-octanediol.

5. The process in accordance with claim 1 wherein said surfactant is a nonionic surfactant comprising a mixture of $C_8$-$C_{18}$ diethanolamides.

6. The process in accordance with claim 1 wherein said anionic or nonionic surfactant is an anionic surfactant comprising a sodium sulfonate.

7. The process in accordance with claim 1 wherein said scrubbing fluid further contains an antifoam agent.

8. The process in accordance with claim 1 wherein said organic compound comprises mineral oil.

9. The process in accordance with claim 1 wherein said spray is in an aerosol comprising droplets.

10. The process in accordance with claim 9 further comprising:

(d) collecting the microemulsion of step (c); and (e) separating said organic compound from said microemulsion.

* * * * *